PLASTIC BOTTLE CAP WITH INTEGRAL HANDLE

Original Filed July 25, 1968 3 Sheets-Sheet 1

PLASTIC BOTTLE CAP WITH INTEGRAL HANDLE

Original Filed July 25, 1968 3 Sheets-Sheet 2

PLASTIC BOTTLE CAP WITH INTEGRAL HANDLE

Original Filed July 25, 1968 3 Sheets-Sheet 3

United States Patent Office

Re. 27,648
Reissued May 29, 1973

27,648

PLASTIC BOTTLE CAP WITH INTEGRAL HANDLE

Jean Grussen, 6 Rue Adolphe Yvon, Paris, France

Original No. 3,462,035, dated Aug. 19, 1969, Ser. No. 747,635, July 25, 1968. Application for reissue June 3, 1971, Ser. No. 149,867
Int. Cl. B65d *41/22*
U.S. Cl. 215—41 25 Claims

Matter enclosed in heavy brackets [ ] appears in the original patent but forms no part of this reissue specification; matter printed in italics indicates the additions made by reissue.

ABSTRACT OF THE DISCLOSURE

A one-piece plastic bottle cap comprising a crown-shaped main part encircled by a reinforcing ring which holds the main part on the bottle and is integral therewith over a 60° sector, but may be swung upwardly and used to pull the cap off the bottle. The cap has two depending skirts and the inside of the outer skirt is provided with retaining means for engagement over the peripheral ridge on the mouth of a bottle.

The difficulties encountered when trying to effect a close seal between plastic caps and glass bottles containing carbonated liquids or compressible bottles under substantial internal pressure from air located above the liquid stored therein are well known.

In effect, the internal ribs designed to hold the cap on are not always adequate to resist the pressure of the gas in the bottle, so that the cap may be spontaneously blown off.

This problem has heretofore been solved by combining plastic caps provided with an internal sealing skirt with external metallic caps such as those known as "crown caps," for example.

The present invention relates to a new type of one-piece cap made of plastic material which does not require the use of a bottle-opener, but is nevertheless capable of resisting high internal pressures in the bottle, said capsule being characterized by the fact that it comprises internal gripping means which are either continuous or separated by relatively thin parts which are extended as weakened points cut into the cap itself. It takes up the same amount of space as a metallic cap of the "crown" type before being applied to the bottle, and may easily be adapted for use in bottle-capping machines of known types by means of slight modifications of the capping heads. The cap comprises an external pull-ring which acts as a reinforcement, said ring being permanently attached to the lower part of the cap so that it cannot be lost by being fastened at one side over an angle of about 60° and, on the opposite side by at least one thin frangible web. The cap is provided at its top with indicating means telling the user where he should exert pressure to tear the frangible webs, so that he may then utilize the ring to pull off the cap by introducing an index finger into a central hole in the ring, while also exerting pressure on a central depression in the top of the cap which serves to prevent swelling of the cap during pasteurization. Introduction of the index finger also permits the thumb to be pressed against a grooved area near said indicia, so as to exert traction on the part of the cap fixed to said ring and thereby flex the cap perpendicularly to its plane of symmetry, and free a part of the retaining ring while tearing said cap and possibly its retaining ring along the line along which it is bent, so as to provide an indication that the bottle has been opened.

Instead of providing indicating means near the preferably grooved area on which the thumb rests, a projection attached to said pulling ring can be provided. This projects radially from the periphery of the ring on the side opposite that at which it is secured to the cap.

Such a projection facilitates the tearing of the web or webs which connect the ring to the cap proper.

It will be readily understood that it is also possible to provide retaining means in the form of two or three members so positioned that the bending takes place at a point at which the retaining means is interrupted.

In either case it is possible to re-use the new cap after it has been removed, but this cap will always display cracks showing that the bottle has previously been opened.

It should be noted that the idea of reinforcing a cap with a ring is extremely old, as is the idea of a pulling ring which may be detached, along a substantial angular sector, from the principal part of the cap.

However, these two devices have never been combined to make it possible to perform all the functions of the cap according to the present application, since the one-piece devices of the prior art have in general comprised a ring connected to a cap by tongues or webs and which is slid into its final position on the cap proper.

Other prior art devices have comprised a pull ring of the type described attached to a simple cap collar which rests on the upper part of the neck of a bottle, but in no case have they comprised a pull ring fixed to the lower part of a cap which indicates that it has been opened, and capable, when in its initial position, of reinforcing the effect of the principal means for holding the cap on the bottle.

In an improved embodiment of the new cap especially adapted for flasks or bottles containing carbonated liquids, improved sealing results from the use of a double-walled skirt of a known type, but characterized by the fact that the innermost wall of the sealing skirt is thinner than the one which is to abut the inside of the neck of the flask or bottle. The thicker wall is preferably provided with a rib which serves as a sealing ring.

Moreover, in order to improve the sealing ability of the cap, it may carry near the upper part of its inner surface, so positioned as to seal against the upper part of a bottle neck between the sealing skirt and the peripheral part of the cap, a sealing ring of compressible material of the plastisol type, preferably made of polyvinyl chloride or copoly polyethylene copolymers and characterized by the fact that this material contains a quantity of plasticizer sufficient to bring its melting point below that of the material used to make the one-piece cap itself, so as to permit said sealing ring to be cast inside the cap or molded thereinto after the cap itself has first been molded.

These two materials are caused to adhere to each other in a conventional manner, by providing grooves, striations, an undulating surface or a roughtened surface in the mating portion of the cap.

The new cap may also comprise a groove at its top which, during removal of the cap, facilitates deformation of the cap and tearing along the weakened lines about its periphery.

This groove is perpendicular to the plane of symmetry of the cap and may be positioned either in a diametral plane or at the level of two weakened lines provided on opposite sides of the part of the cap which is fixed to the cap which is fixed to the cap-opening ring.

The characteristics of the present invention will be better understood from a reading of the following description of several embodiments of one-piece plastic caps according to the invention, which embodiments are described purely by way of example, with reference to the accompanying drawings, in which.

Figure 1:
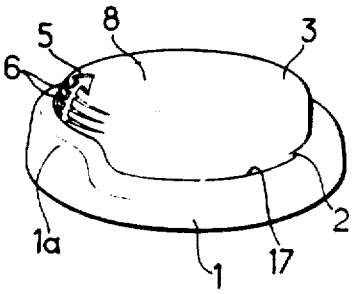
FIG. 1 is a perspective view, taken from above a cap according to the invention before it has been removed from a bottle.
Figure 3:
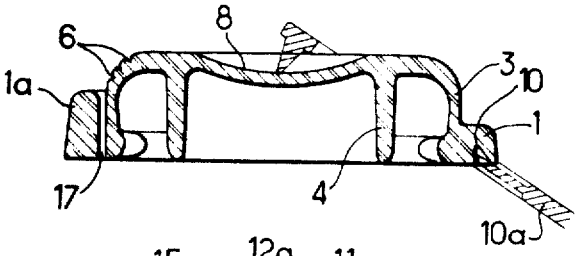
FIG. 3 is a vertical diametral section taken along the line III—III of FIG. 4, showing schematically the way in which it cooperates with a bottle opener, by means of a groove provided for that purpose.

As shown in FIG. 1, the cap comprises a pulling ring 1 attached along part of its periphery, between two notches, one of which is shown at 2 on FIG. 1, to a one-piece bottle cap 3 comprising an inner sealing skirt 4, best seen on FIG. 3.

The cap 3 comprises a mark 5, diametrically opposite the point at which the ring 1 is secured to the cap proper, which designates the point at which the ring should be pushed upward to free it from the cap. This area is also grooved to roughen the surface engaged by the thumb 7 of the user in the manner shown in FIG. 2.

As hereinbefore pointed out, the mark 5 may be eliminated when the pull-ring 1 is provided with a radially projecting boss which serves to indicate the point at which pressure should be applied to separate the ring from the cap.

Figure 4:
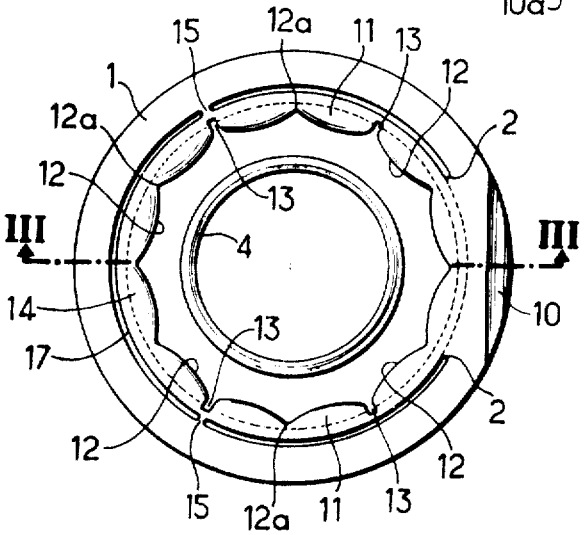
FIG. 4 is a plan view taken from the bottom of the same cap.

FIGS. 1 and 4 show that the cap 3 is provided at its center with a depression 8 on which the index finger 9 of the user rests when introduced into the pull-ring 1, and which prevents swelling of the capsule during pasteurization.

Figure 2:
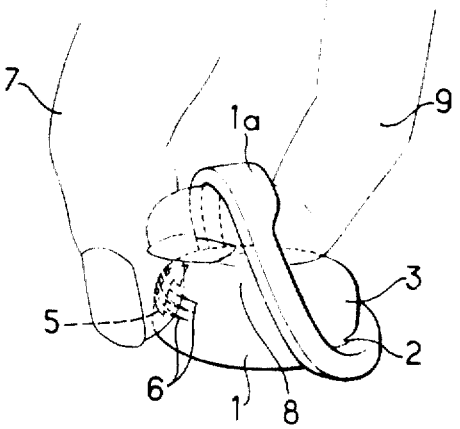
FIG. 2 shows the same cap in the course of being removed from a bottle by means of the pull ring.

FIG. 2 shows that the cooperative action of the digits 7 and 9 and the pull-ring 1 permit removal of the cap by pulling the ring 1, and the part of the cap 3 secured to that ring, in the direction of the thumb 7.

It will be hereinafter seen that, during this operation, the cap is subjected to stresses which cause flexing about a short radius of curvature equivalent to bending, at certain weakened points on the cap.

FIGS. 3 and 4 show that the lower part of the ring 1 is provided with a groove 10 to faciliate removal of the cap by using a conventional bottle-opener.

The details of the internal retaining ring 11 are shown on FIG. 4.

This ring has a scalloped inner edge delimiting alternating portions 12 having a maximum radial thickness, and 12a having a minimum radial thickness.

Moreover, the external wall of the cap is weakened at four points 13 at which the retaining ring is interrupted, so as to permit the cap, when pressed by the index finger 9, before complete separation of the retaining ring, especially when pressed on the side 14 opposite the part of the cap secured to the pull-ring 1, to flex along three generatrices perpendicular to the plane of symmetry III—III.

It should also be noted that the retaining ring 11 is joined to the cap 3 by two small, easily torn webs, shown at 15 on FIG. 4, which are, in the embodiment described, aligned with the two weakened points 13, but may also be spaced from these points.

The fact that the bottle has been opened is indicated by the rupture of the webs 15, but when the pull-ring 1 is put back in place to reclose a bottle which has been opened, the tear in the webs is not highly visible. However, removal of the cap also results in visible tears along the vertical external wall of the cap in alignment with the weakened points 13. These tears are not shown in the drawing.

Figure 5:
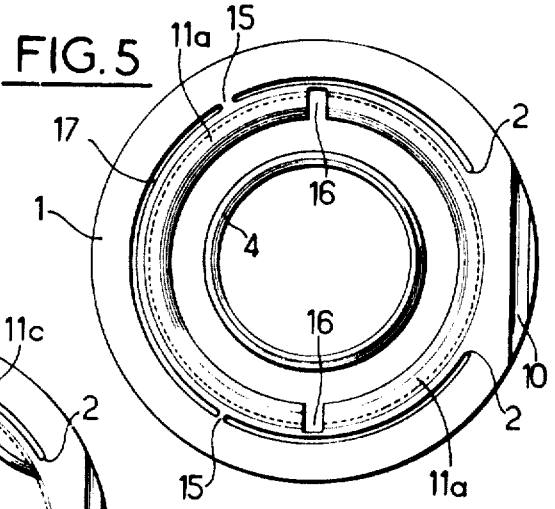
FIG. 5 is a bottom plan view of another embodiment of the cap according to the invention, comprising a discontinuous retaining ring consisting of two symmetrical semi-circular components.
Figure 6:
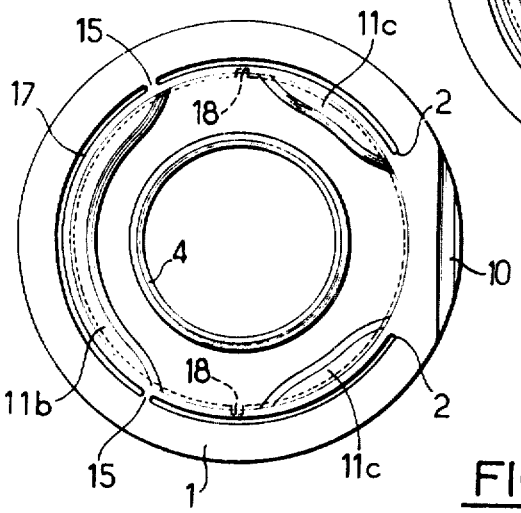
FIG. 6 is a bottom plan view of a third embodiment of the invention comprising a discontinuous retaining ring composed of three components separated from each other by substantial intervals.

In the embodiments shown in FIGS. 5 and 6, the pull-ring 1 is secured to the cap 3 in the same way as in FIG. 4, but the retaining ring, in the embodiment of FIG. 5, comprises two symmetrically positioned arcuate segments 11a separated by slots 16 which extend into the external wall of the cap 3, but do not reach the slit 17 separating the pull-ring 1 from the cap 3.

When the cap is removed, its external wall is torn adjacent the two slots 16 and these tears remain visible after the cap has been used to recap a bottle and the ring 1 has been put back in place.

In the embodiment shown in FIG. 6, the retaining ring consists of a member 11b, which occupies about 120° sector, and two symmetrically positioned members, each of which occupies a sector of about 60°.

It is easy to understand that regardles of how the cap is removed, whether by means of the pull-ring 1 or by means of a bottle opener such as the bottle opener 10a of FIG. 3, it is advantageous that there be no retaining ring along the part of the capsule on which force is exerted, so that the elements 11c may be easily flexed to facilitate removal of the cap from the neck of the bottle.

In like manner, in alignment with the weakened points in the external wall of the cap, shown at 18 in FIG. 6, flexing takes place along a line perpendicular to the plane of symmetry of the cap and aligned with the spaces between the retaining members 11b and 11c.

This flexing produces tears in alignment with the weakened points 18. These tears remain visible after the pull-ring 1 has been put back in place.

Of course, the embodiment of FIG. 5, which comprises a retaiinng ring having a substantial radial thickness, which is interrupted only at two points over very small angular sectors, is especially designed for bottles in which there is a high gas pressure, the other embodiments being adequate in most other cases.

In order to make it easier to insert the index finger 9 in the ring 1, FIGS. 1 and 3 show that the ring is thicker at 1a on the side opposite the part secured to the cap 3.

Figure 7:
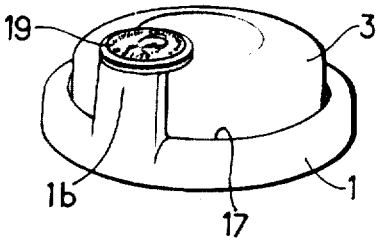
FIG. 7 is a perspective view taken from above another embodiment of the cap according to the invention adapted to receive a tax stamp.
Figure 8:
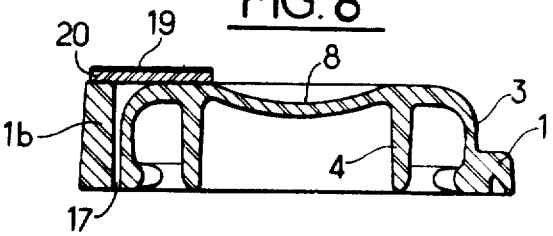
FIG. 8 is a vertical diametral section through the cap shown in FIG. 7, taken along the line passing through the center of said tax stamp.

In the embodiment of FIGS. 7 and 8 the pull-ring 1 is also provided with a boss 1b, shaped differently from the boss 1a, positioned on the side of the ring opposite the part thereof which is secured to the cap 3, so that the cap may be used as a tax stamp replacing the stamp required in the case of alcoholic beverages.

In this case, a piece of cardboard, or preferably a wafer of plastic material to which a printed aluminum film has been applied, is adhesively secured or heat welded to the top of the cap 3 and the boss 1b.

Preferably the plastic material is the same as that of which the cap is made.

Tearing of the piece of cardboard stuck over the boss 1b and the cap 3, or the tax wafer, when the webs 13 are torn, serves as an additional indication that the bottle has been opened.

When a plastic wafer is used, this material is usually heat welded onto the boss 1b and the cap 3, but it could, of course, be adhesively secured.

A wafer of this type is shown on FIGS. 7 and 8; the printed aluminum is identified by reference numeral 19 and the lower layer of plastic material by reference numeral 20.

Figure 9:
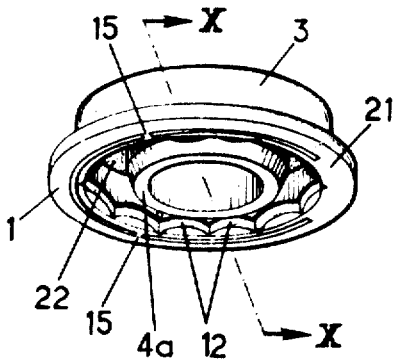
FIG. 9 is a perspective view taken from below a cap comprising a sealing skirt having two walls which differ in thickness.
Figure 10:
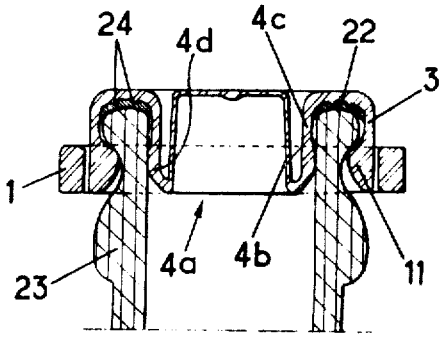
FIG. 10 is an axial section showing the cap of FIG. 9 mounted on the neck of a bottle.

FIGS. 9 and 10 show the retaining ring 11, which is variable in thickness, and the lower part of a sealing skirt 4a shown in greater detail on FIG. 10.

The pull-ring 1 is secured to the cap proper at the part 21 which extends over an angular sector of about 60°, and is also secured at its opposite side to the lower part of said cap by means of two frangible webs 15.

FIG. 9 also shows the plastisol sealing ring 22 which covers the part of the cap 3 between the sealing skirt 4a and the peripheral skirt.

This sealing skirt comprises a thin inner wall 4b (FIG. 10) and a thicker outer wall 4c provided with an annular rib 4d which seals against the inside of the neck of the bottle.

Figure 12:
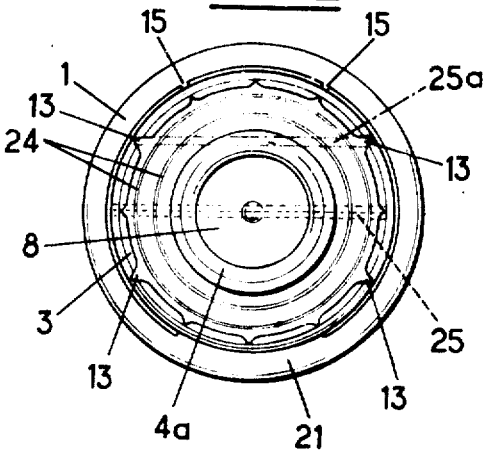
FIG. 12 is a bottom plan view showing this same cap without its plastisol seaing ring.

The plastisol sealing ring 22 is caused to adhere to the material of the cap by providing two ribs 24 on the inside of the cap, as shown in FIG. 12.

Figure 11:
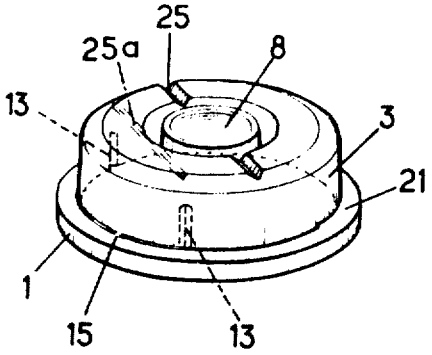
FIG. 11 is a perspective view taken from above the cap of FIG. 9, showing two embodiments of said cap.

This latter figure also shows the two webs 15 connecting the ring 1 to the periphery of the cap 3, as well as four scorings 13, two of which are shown in broken lines on FIG. 11, and along which the cap is torn during its removal, which is effected by pressing on the central part 8 of the cap while pulling on it by means of the ring 1.

For the sake of simplicity the external ribs and marks on the side opposite the part 21 of the ring, and the thickened part 1a shown in FIG. 3, have not been shown in FIG. 11.

As previously pointed out, the cap may have either a diametral groove 25 or a groove 25a shown in phantom lines, in alignment with the two scorings 13 shown on FIG. 11. Regardless of its exact position, such a groove facilitates removal of the cap and its tearing along certain of the scorings.

The grooves 25 and 25a, the webs 15 and the portion 21 of the ring 1 which is connected to the cap 3 are found in FIG. 12 as well.

It will be appreciated that the foregoing embodiments have been described purely by way of example and they may be modified as to detail without thereby departing from the basic principles of the invention.

In particular, only two instead of four scorings 13 may be provided, and these may be oriented toward the side of the cap to which the ring is secured.

What is claimed is:

1. One-piece plastic bottle cap comprising inner and outer skirts depending from a circular top and an external reinforcing ring secured to said cap, encircling said outer skirt, and adapted to be used as means for removing said cap, said plastic cap being characterized by the fact that it comprises retaining means on the inside of said outer skirt, [said retaining means having a maximum radial dimension attained along only part of the inner wall of said outer skirt], that said cap has external dimensions approximating those of a conventional crown cap, that said reinforcing ring is integrally connected to the lower part of said cap over a sector of at least nearly 60° on one side of said cap and by at least one frangible web on the opposite side of said cap.

2. Cap as claimed in claim 1 which is scored along lines at spaced intervals about its peripheral wall so as to tear along those lines when removed from a bottle, said points being visible when said reinforcing ring is in place on said cap.

3. Cap as claimed in claim 2 in which said scored lines are in alignment with spaces which separate said retaining means into arcuate segments.

4. Cap as claimed in claim 1 having an external mark above said reinforcing ring opposite its integral 60° connection to said cap.

5. Cap as claimed in claim 1 comprising a central depression in the top thereof which prevents radial expansion of the cap during pasteurization and is adapted to receive the index finger of a user when the cap is being removed.

6. Cap as claimed in claim 1 in which said reinforcing collar comprises a radially projecting protuberance on the side opposite its integral 60° connection to said cap.

7. Cap as claimed in claim 1 which comprises a roughened portion on the side opposite the 60° integral connection of said ring to said cap.

8. Cap as claimed in claim 1 in which said ring is connected to said cap by two frangible webs symmetrically positioned opposite the 60° integral connection of said ring to said cap.

9. Cap as claimed in claim 1 in which the lower surface of said ring is provided, near its 60° connection to said cap, with a groove adapted to be engaged by a conventional bottle opener.

10. Cap as claimed in claim 1 in which said retaining means has a scalloped edge and is divided into segments by four circumferentially equidistant notches.

11. Cap as claimed in claim 1 in which said retaining means comprises two semi-circular members symmetrically positioned with respect to a diametral plane perpendicular to the plane of symmetry of the cap and separated by short circumferential openings.

12. Cap as claimed in claim 11 in which said openings extend into the peripheral wall of the cap to form weakened points for initiating tears in said cap when it is removed from the bottle.

13. Cap as claimed in claim 1 in which said retaining means comprises one flange extending over a sector of about 120° opposite the integral connection of said ring to said cap, and two symmetrically positioned flanges occupying sectors of about 60° each and spaced about 60° from each other.

14. Cap as claimed in claim 1 in which said reinforcing ring is thicker on the side opposite its 60° connection to the cap and is provided with a boss on its upper part.

15. Cap as claimed in claim 14 in which said boss extends upwardly to the top of the cap proper.

16. Cap as claimed in claim 15 which comprises a seal extending across said boss and the top of said cap.

17. Cap as claimed in claim 1 in which said sealing skirt comprises an inner wall and a thicker outer wall radially spaced therefrom.

18. Cap as claimed in claim 17 in which said outer wall is provided with an external rib positioned to seat against the inside of a bottle's neck.

19. Cap as claimed in claim 1 comprising a compressible sealing ring between its peripheral wall and said sealing skirt, said sealing ring being made of a plastisol containing sufficient plasticizer to bring the melting point of the material of which the sealing ring is made below that of the material of which the cap proper is made.

20. Cap as claimed in claim 19 in which said compressible sealing ring is made of a plastisol based on a material selected from the group consisting of polyvinyl and polyethylene copolymers.

21. Cap as claimed in claim 19 in which the surface of said cap in contact with said sealing ring is roughened to facilitate adhesion of said sealing ring to said cap.

22. Cap as claimed in claim 2 which is provided with a groove in its upper surface.

23. Cap as claimed in claim 22 in which said groove lies in a diametral plane.

24. Cap as claimed in claim 22 in which said groove is in alignment with two scorings in the peripheral wall of the cap and lies on the side of said cap opposite its 60° connection to said ring.

*25. Cap as claimed in claim 1 in which said retaining means has a maximum radial dimension attained along only part of the inner wall of said outer skirt.*

References Cited

The following references, cited by the Examiner, are of record in the patented file of this patent or the original patent.

UNITED STATES PATENTS

| | | | |
|---|---|---|---|
| 2,895,654 | 7/1959 | Rieke | 220—94 A |
| 3,341,046 | 9/1967 | Bereziat et al. | 215—41 |
| 3,343,700 | 9/1967 | Heubl | 215—41 |
| 3,589,543 | 6/1971 | Weigand | 215—42 |

GEORGE T. HALL, Primary Examiner

U.S. Cl. X.R.

215—46 A, 42, 100 A; 220—94 A